(12) United States Patent
Geng et al.

(10) Patent No.: US 11,364,666 B2
(45) Date of Patent: Jun. 21, 2022

(54) THERMOPLASTIC COMPOSITIONS HAVING HIGH STIFFNESS AND METHODS OF MAKING THEM

(71) Applicant: SHPP GLOBAL TECHNOLOGIES B.V., Bergen op Zoom (NL)

(72) Inventors: Eddie Kebin Geng, Exton, PA (US); Paul Long, Exton, PA (US); Todd Peterson, Exton, PA (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 17/283,702

(22) PCT Filed: Oct. 9, 2019

(86) PCT No.: PCT/IB2019/058614
§ 371 (c)(1),
(2) Date: Apr. 8, 2021

(87) PCT Pub. No.: WO2020/075095
PCT Pub. Date: Apr. 16, 2020

(65) Prior Publication Data
US 2021/0316490 A1   Oct. 14, 2021

Related U.S. Application Data

(60) Provisional application No. 62/743,412, filed on Oct. 9, 2018.

(51) Int. Cl.
| | | |
|---|---|---|
| *B29C 48/00* | (2019.01) | |
| *C08K 3/22* | (2006.01) | |
| *C08K 3/32* | (2006.01) | |
| *C08K 5/524* | (2006.01) | |
| *C08K 7/08* | (2006.01) | |
| *C08L 67/02* | (2006.01) | |
| *B29K 67/00* | (2006.01) | |
| *B29K 69/00* | (2006.01) | |
| *C08L 23/08* | (2006.01) | |
| *C08L 69/00* | (2006.01) | |

(52) U.S. Cl.
CPC .............. *B29C 48/023* (2019.02); *C08K 3/22* (2013.01); *C08K 3/32* (2013.01); *C08K 5/524* (2013.01); *C08K 7/08* (2013.01); *C08L 67/02* (2013.01); *B29C 2948/92542* (2019.02); *B29C 2948/92561* (2019.02); *B29K 2067/006* (2013.01); *B29K 2069/00* (2013.01); *C08K 2003/2227* (2013.01); *C08K 2003/324* (2013.01); *C08K 2201/004* (2013.01); *C08L 23/0884* (2013.01); *C08L 69/00* (2013.01); *C08L 2205/025* (2013.01); *C08L 2205/035* (2013.01); *C08L 2205/08* (2013.01)

(58) Field of Classification Search
None
See application file for complete search history.

(56) References Cited

U.S. PATENT DOCUMENTS

| | | | |
|---|---|---|---|
| 7,786,246 B2 | 8/2010 | Jansen et al. | |
| 2008/0246191 A1 | 10/2008 | Agarwal et al. | |
| 2012/0076573 A1* | 3/2012 | Pilliod | B29C 45/0005 403/265 |
| 2015/0368458 A1* | 12/2015 | Sun | C08K 7/14 523/400 |

FOREIGN PATENT DOCUMENTS

| | | |
|---|---|---|
| CN | 101679728 A | 3/2010 |
| CN | 102108149 A | 6/2011 |
| CN | 102108186 A | 6/2011 |
| CN | 102558666 A | 7/2012 |
| CN | 104403257 A | 3/2015 |
| CN | 104403283 A | 3/2015 |
| CN | 104497501 A | 4/2015 |
| CN | 106459564 A | 2/2017 |
| CN | 112004885 A | 11/2020 |
| EP | 3158002 A1 | 4/2017 |
| WO | 2019199970 A1 | 10/2019 |

OTHER PUBLICATIONS

International Preliminary Report on Patentability in PCT/IB2019/058614 dated Oct. 2, 2020 (5 pages.).
International Search report and Written Opinion issued in International Application No. PCT/IB2019/058614, dated Nov. 25, 2019, 12 pages.

* cited by examiner

*Primary Examiner* — Robert T Butcher
(74) *Attorney, Agent, or Firm* — Quicker Law, LLC

(57) ABSTRACT

An extruded thermoplastic composition includes: (a) from about 20 wt % to about 75 wt % of a ceramic fiber component; (b) from about 15 wt % to about 70 wt % of a polybutylene terephthalate (PBT) component including a high molecular weight PBT and a low molecular weight PBT; (c) from about 5 wt % to about 23 wt % of a polycarbonate component; and (d) from about 1 wt % to about 10 wt % of a compatibilizer component. Methods of making the extruded thermoplastic composition are also described.

9 Claims, 7 Drawing Sheets

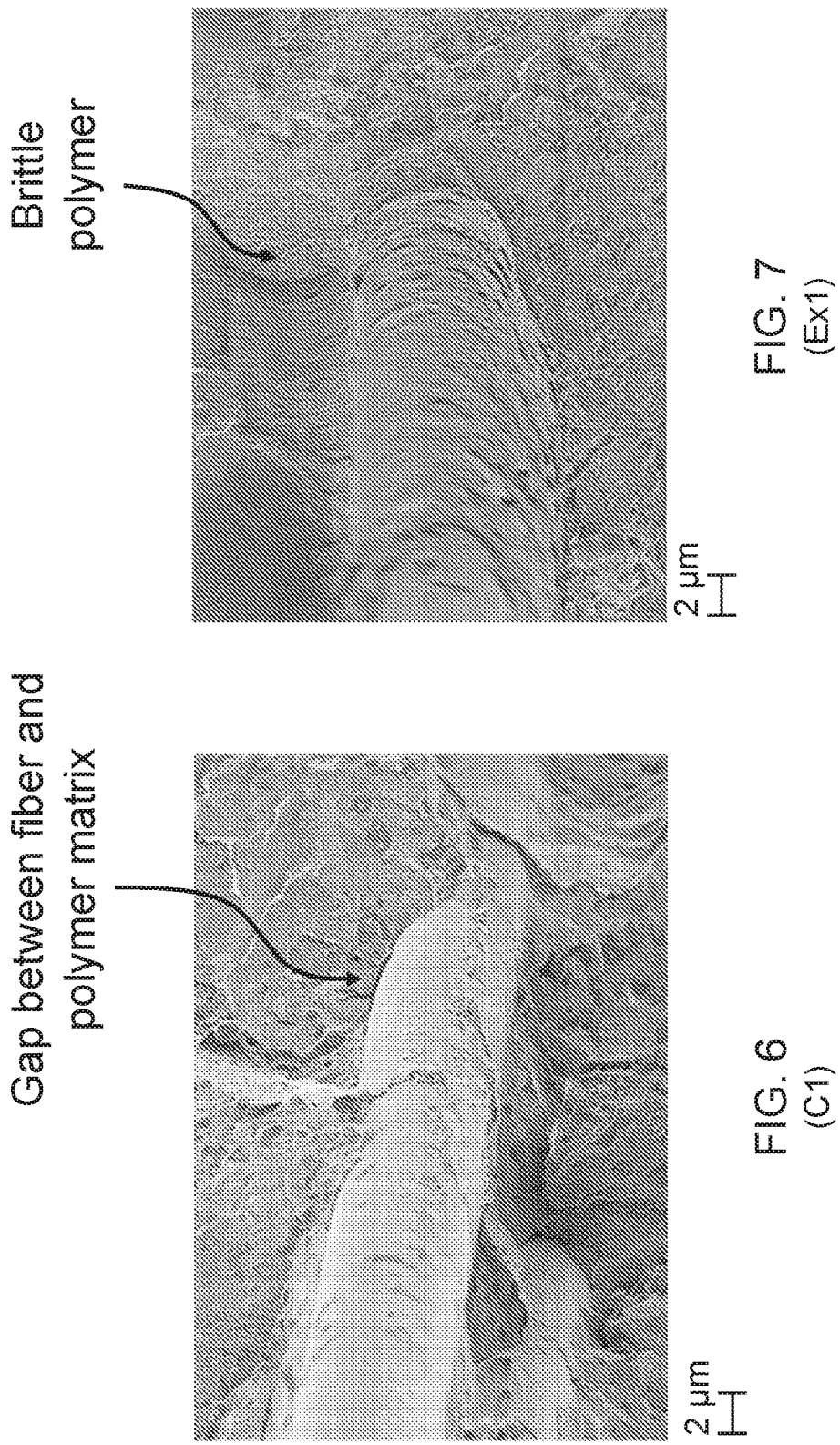
FIG. 6 (C1)
FIG. 7 (Ex1)

(Ex5)

THERMOPLASTIC COMPOSITIONS HAVING HIGH STIFFNESS AND METHODS OF MAKING THEM

CROSS-REFERENCE TO RELATED APPLICATION

This application is the National Stage of International Application No. PCT/IB2019/058614 filed Oct. 9, 2019, which claims the benefit of U.S. Provisional Application No. 62/743,412 filed Oct. 9, 2018, the disclosures of which are incorporated herein by this reference in their entireties.

FIELD OF THE DISCLOSURE

The present disclosure relates to thermoplastic compositions, and in particular to extruded thermoplastic compositions that have a high ceramic fiber content and good strength and elongation properties.

BACKGROUND OF THE DISCLOSURE

The properties of extruded thermoplastic materials are substantially affected by the molecular weight of the polymer matrix and, where the material includes fibers, the residual fiber length in the final molded part. A twin-screw extrusion process can effectively disperse the fibers in the polymer melt, however, the extreme high shearing stress inside the barrel of the extruder breaks down the fibers dramatically, resulting in reduced residual fiber length. This effect is even more pronounced when processing with brittle fibers such as alpha-aluminum oxide fiber. In addition, the high shear-mixing generates excessive heat, which can break down the polymer chains in the matrix.

Long fiber thermoplastic (LFT) compounds such as SABIC VERTON™ and PolyOne OnForce™ have been used to form compositions having a much longer residual fiber length; however, if the fiber length is too long melt flow characteristics of the composition are adversely affected, making further down-stream processes such as injection molding very difficult. Special tools or mold designs are typically necessary to accommodate those compositions. Moreover, because the residence time of the polymer melt in the die block during the pultrusion process is frequently very long, the matrix polymer often degrades, further deteriorating the properties of the composition.

These and other shortcomings are addressed by aspects of the present disclosure.

SUMMARY

Aspects of the disclosure relate to extruded thermoplastic composition including: (a) from about 20 wt % to about 75 wt % of a ceramic fiber component; (b) from about 15 wt % to about 70 wt % of a polybutylene terephthalate (PBT) component including a high molecular weight PBT and a low molecular weight PBT; (c) from about 5 wt % to about 23 wt % of a polycarbonate component; and (d) from about 1 wt % to about 10 wt % of a compatibilizer component.

Aspects of the disclosure further relate to methods of making a thermoplastic composition, including:
a) combining, to form a mixture: a polybutylene terephthalate (PBT) component including a high molecular weight PBT and a low molecular weight PBT; a polycarbonate component; and a compatibilizer component;
b) extruding the mixture to form the thermoplastic composition under extrusion conditions that apply a specific energy of less than about 90 Watt-hour per kilogram W-Hr/kg to the thermoplastic composition at a residence time of less than 70 seconds—or a specific energy of less than about 150 W-Hr/kg to the thermoplastic composition at a residence time of less than 60 seconds or less than 45 seconds; and
c) adding a ceramic fiber component to the mixture during either step (a) or during step (b).

The extruded thermoplastic composition includes:
i) from about 20 wt % to about 75 wt % of the ceramic fiber component;
ii) from about 15 wt % to about 70 wt % of the polybutylene terephthalate (PBT) component including the high molecular weight PBT and the low molecular weight PBT;
iii) from about 5 wt % to about 23 wt % of the polycarbonate component; and
iv) from about 1 wt % to about 10 wt % of the compatibilizer component.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 is a SEM image showing fiber adhesion within a polymer matrix of a comparative composition (C1) described in the examples of the disclosure.

FIG. 7 is a SEM image showing fiber adhesion within a polymer matrix of an example composition (Ex1) described in the examples of the disclosure.

DETAILED DESCRIPTION

Figure 1:
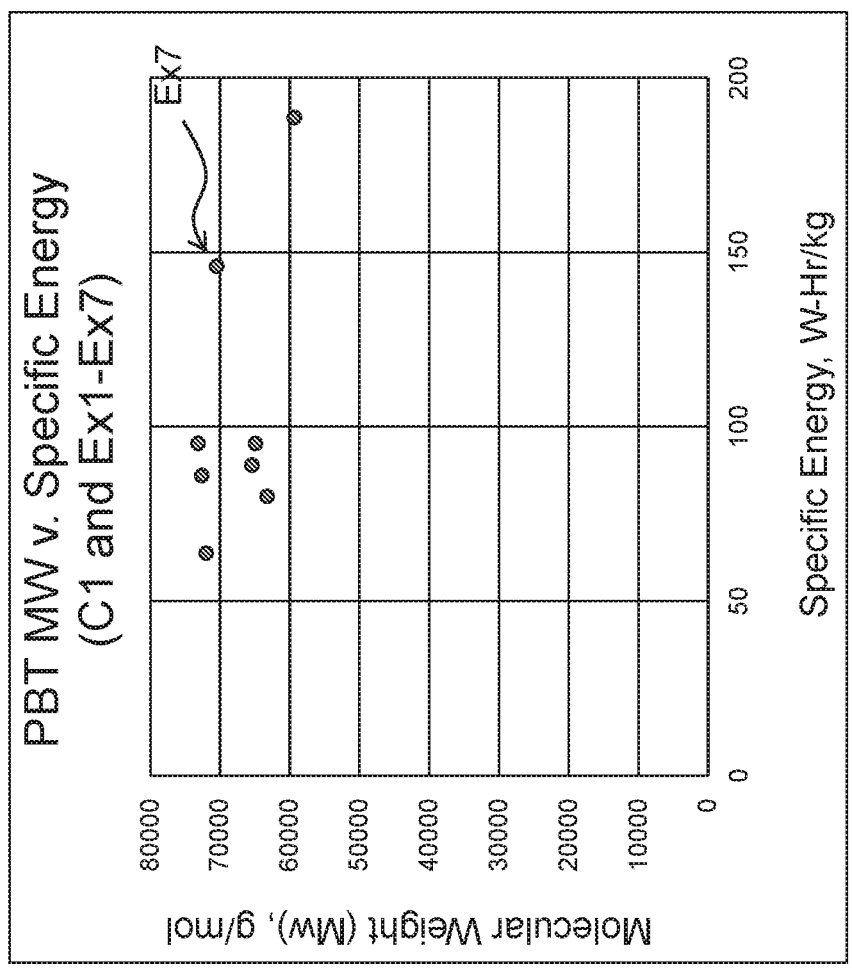
FIG. 1 is a graph showing PBT molecular weight vs. specific energy for thermoplastic compositions according to aspects of the disclosure.

The present disclosure can be understood more readily by reference to the following detailed description of the disclosure and the Examples included therein. In various aspects, the present disclosure pertains to extruded thermoplastic compositions including: (a) from about 20 wt % to about 75 wt % of a ceramic fiber component; (b) from about 15 wt % to about 70 wt % of a polybutylene terephthalate (PBT) component including a high molecular weight PBT and a low molecular weight PBT; (c) from about 5 wt % to about 23 wt % of a polycarbonate component; and from about 1 wt % to about 10 wt % of a compatibilizer component. In certain aspects the thermoplastic composition is extruded under conditions that apply a specific energy of less than about 90 W-Hr/kg to the extruded thermoplastic composition. It has been found that thermoplastic compositions extruded under these conditions have improved fiber length and polymer molecular weight (Mw) retention, which results in the compositions having improved mechanical properties, including but not limited to impact strength and elongation.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additive material" means that the additive material can or cannot be included in the thermoplastic composition and that the description includes thermoplastic compositions that both include and do not include additive materials.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

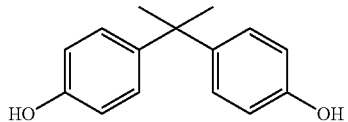 [SMILES: CC(C)(c1ccc(O)cc1)c1ccc(O)cc1]

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to a thermoplastic composition including: (a) from about 20 wt % to about 75 wt % of a ceramic fiber component; (b) from about 15 wt % to about 70 wt % of a polybutylene terephthalate (PBT) component including a high molecular weight PBT and a low molecular weight PBT; (c) from about 5 wt % to about 23 wt % of a polycarbonate component; and (d) from about 1 wt % to about 10 wt % of a compatibilizer component. The combined weight percent value of all components does not exceed 100 wt %, and all weight percent values are based on the total weight of the extruded thermoplastic composition.

The composition may include from about 5 wt % to about 23 wt %, or from about 5 wt % to about 15 wt %, or from about 5 wt % to about 12 wt %, or from bout 3 wt % to about 12 wt % of any suitable polycarbonate component. In certain aspects, the polycarbonate component can include any polycarbonate material or mixture of materials, for example, as recited in U.S. Pat. No. 7,786,246, which is hereby incorporated in its entirety for the specific purpose of disclosing various polycarbonate compositions and methods. In some aspects the polycarbonate is a homopolymer including repeating units derived from bisphenol A. The polycarbonate may include polycarbonate monomers such as, but not limited to, 2-phenyl-3,3'-bis (4-hydroxy phenyl) phthalimidine (PPPBP) and dimethyl bisphenol cyclohexane (DMBPC).

In particular aspects the polycarbonate is a polycarbonate copolymer including repeating units derived from bisphenol A, sebacic acid, polysiloxane, isophthalate terephthalate resorcinol (ITR), phosphate or a combination thereof. Exemplary polycarbonate copolymers include, but are not limited to, polycarbonate-siloxane copolymer (such as EXL resin available from SABIC), isophthaloyl and terephthaloyl resorcinol (ITR) polyester-carbonate (such as SLX resin available from SABIC), high flow high heat polycarbonate copolymer (such as XHT resin available from SABIC), oligomeric phosphonate (such as FRX resin available from FRX Polymers, Inc.). The polycarbonate may be end-capped and may include, but is not limited to, the following end-capping agents: 1,1',1",-tris (4'-hydroxyphenyl) ethane (THPE) and p-hydroxybenzonitrile (HBN). In particular, HBN-endcapped polycarbonate (such as CFR polycarbonate resin available from SABIC) could contribute to flame retardancy (FR) performance of the thermoplastic compositions. The polycarbonate may include a post-consumer recycle polycarbonate. In one example, the polycarbonate component is The composition includes in some aspects from about 15 wt % to about 70 wt % of a PBT component including a high molecular weight PBT and a low molecular weight PBT in some aspects. In further aspects the composition includes from about 15 wt % to about 35 wt %, or from about 10 wt % to about 70 wt %, or from about 10 wt % to about 50 wt %, or from about 15 wt % to about 50 wt %, or from about 15 wt % to about 45 wt % (based on the total weight of the thermoplastic composition, of a PBT component including a high molecular weight PBT and a low molecular weight PBT.

As used herein, PBT can be used interchangeably with poly(1,4-butylene terephthalate). PBT is one type of polyester. Polyesters, which include poly(alkylene dicarboxylates), liquid crystalline polyesters, and polyester copolymers, can be useful in the disclosed thermoplastic compositions of the present disclosure. Any suitable high molecular weight PBT and low molecular weight PBT may be included in the composition. As used herein, a high molecular weight PBT is a PBT having a Mw of greater than about 100,000 grams per mole (g/mol) and a low molecular weight PBT is a PBT having a Mw of less than about 70,000 g/mol. The high molecular weight PBT and low molecular weight PBT may also be described with reference to the intrinsic viscosity (IV) of the PBT. The high Mw PBT may have an IV of greater than about 1.0 deciliters per gram (dL/g), while the low Mw PBT may have an IV of less than about 0.8 dL/g. The polybutylene terephthalate may include a chemically-upcycled PBT, such as the VALOX™ resins available from SABIC. A suitable high Mw PBT is VALOX™ Resin 315, available from SABIC. A suitable low Mw PBT is VALOX™ Resin 195, also available from SABIC. In some aspects the ratio of high Mw PBT to low Mw PBT in the PBT component is from about 15:85 to about 35:65. In further aspects the ratio of high Mw PBT to low Mw PBT in the PBT component is from about 20:80 to about 25:75. In various examples, the high molecular weight PBT may be present in an amount from about 1 wt % to about 10 wt %, or from about 2 wt % to about 12 wt %, or from about 3 wt % to about 15 wt % based on the total weight of the composition. A low molecular weight PBT may be present in an amount from about 8 wt % to about 20 wt %, or from about 2 wt % to about 25 wt %, or from about 8 wt % to about 30 wt %, or from about 10 wt % to about 25 wt % based on the total weight of the composition.

The thermoplastic composition includes from about 20 wt % to about 75 wt % of a ceramic fiber component in some aspects, or from about 50 wt % to about 75 wt %, or from about 30 wt % to about 75 wt %, or from about 45 wt % to about 75 wt %, in particular aspects. Ceramic fiber has been increasingly used in some compositions due to its properties: high strength and supper high stiffness, extremely low thermal expansion, fire resistance, electrical insulation and high temperature resistance over 2,000° C. Compared to other common reinforcing fibers, ceramic fibers such as 3M™ Nextel 610 alpha-alumina have a high filament tensile modulus at 370 gigapascals (GPa), much higher than E-glass fiber at 9.7 GPa, S-Glass fiber at 89 GPa and even carbon fiber at 240 GPa. Moreover, carbon fiber is electrically conductive and interferes with electrical-magnetic signal transmission, and glass fibers have a relatively higher dielectric constant (Dk) of 5-10. In contrast, ceramic fibers are electrically insulating and have a lower Dk of about 4.7 at 9.5 gigahertz (GHz) and are thus a desirable reinforcing fiber for producing super stiff composites for thin-wall applications where radio transmission is important. In certain aspects of the present disclosure, the compositions are free of or substantially free of a glass fiber filler.

The ceramic fiber component can include any suitable type of ceramic fiber. In certain aspects the ceramic fiber includes, but is not limited to, alumina, polycrystalline alumina, aluminum silicate, and combinations thereof. In a particular aspect the ceramic fiber component includes a chopped ceramic fiber such as Nextel 610, available from 3M™, which is a ¼ inch (6 millimeter (mm)) chopped ceramic oxide fiber. The ceramic fiber may in some aspects have a tensile modulus of at least about 150 gigapascals (GPa). In further aspects the ceramic fiber has a tensile modulus of from about 150 GPa to about 500 GPa, or from about 150 GPa to about 300 GPa. In one example, the ceramic fiber is an alpha-alumina (α-alumina).

The thermoplastic composition may in some aspects include a transesterification quenching agent. The transesterification quenching agent may be included as a processing aid and could help prevent a transesterification reaction between polycarbonate and PBT. In a further aspect, the transesterification quenching agent is a phosphorus-containing stabilizer. In a still further aspect, the transesterification quenching agent includes a phosphorus-containing stabilizer. In a yet further aspect, the transesterification quenching agent is an acidic phosphate salts, for example, a monozinc phosphate, sodium dihydrogen phosphate, potassium hydrogen phosphate, calcium hydrogen phosphate, sodium acid pyrophosphate and mixtures thereof. In an even further aspect, the transesterification quenching agent includes a phosphite compounds, e.g. a phosphite compound of the general formula P—(OR')$_3$ wherein each R' is the same or different and independently represents hydrogen, alkyl groups, aryl groups or any mixture thereof provided that at least one of the R' groups is hydrogen or alkyl. Illustratively, these include, but are not limited to, diphenylisodecyl phosphite, diisooctyl phosphite, dilauryl phosphite, diphenyl phosphite, phenyl diisodecyl phosphite, ethyl hexyl diphenyl phosphite, stearyl phosphite and mixtures thereof. In a still further aspect, the transesterification quenching agent includes a Group IB or Group IIB phosphate salt such as zinc phosphate. In a further aspect, the transesterification quenching agent includes a phosphorous oxo-acid such as phosphorous acid, phosphoric acid, polyphosphoric acid, or hypophosphorous acid.

In a further aspect, the phosphorus-containing stabilizer is selected from zinc phosphate, diphenylisodecyl phosphite, monosodium phosphate and sodium acid pyrophosphate and mixtures thereof. In a still further aspect, the phosphorus-containing stabilizer is zinc phosphate.

In a further aspect, the transesterification quenching agent is selected from an acidic phosphate salt, a Group IB phosphate salt, a Group IIB phosphate salt, a phosphorus oxo-acid, and mixtures thereof. In a still further aspect, the transesterification quenching agent is an acidic phosphate salt. In a yet further aspect, the transesterification quenching agent is selected from a Group IB phosphate salt and a Group IIB phosphate salt. In an even further aspect, the transesterification quenching agent is mono zinc phosphate. In a still further aspect, the transesterification quenching agent is a phosphorus oxo-acid. The transesterification quenching agent can be sodium stearate. In particular aspects the transesterification quenching agent may include, but is not limited to, an acidic phosphate salt, a Group IB phosphate salt, a Group IIB phosphate salt, a phosphorus oxo-acid, and combinations thereof.

When included, the transesterification quenching agent may be present in the thermoplastic composition in an amount from greater than about 0 wt % to about 1 wt %.

In addition to the foregoing components, the disclosed thermoplastic compositions can optionally include a balance amount of one or more additive materials ordinarily incorporated in thermoplastic compositions of this type, with the proviso that the additives are selected so as to not significantly adversely affect the desired properties of the thermoplastic composition. Combinations of additives can be used. Such additives can be mixed at a suitable time during the mixing of the components for forming the composition. Exemplary and non-limiting examples of additive materials that can be present in the disclosed thermoplastic compositions include an impact modifier, an antioxidant, a colorant, a de-molding agent, a dye, a flow promoter, a flow modifier, a light stabilizer, a lubricant, a mold release agent, a pigment, a quenching agent, a thermal stabilizer, an ultraviolet UV absorbant, a UV reflectant, a UV stabilizer, an epoxy chain extender, a flame retardant, and combinations thereof.

In some aspects the composition includes from 1 wt % to about 10 wt %, or from about 2 to about 8 wt. %, or from about 2 wt % to about 6 wt %, of a compatibilizer component. In certain aspects the compatibilizer component is an ethylene/alkyl acrylate/glycidyl methacrylate terpolymer compatibilizer component. The ethylene/alkyl acrylate/glycidyl methacrylate terpolymer compatibilizer component may include, but is not limited to, ethylene methyl acrylate glycidyl methacrylate, ethylene ethyl acrylate glycidyl methacrylate, and combinations thereof. In a particular aspect the ethylene/alkyl acrylate/glycidyl methacrylate terpolymer compatibilizer component is a PC/terpolymer blend, such as Lotader™ AX8900, available from Arkema.

In certain aspects the thermoplastic composition is extruded under conditions that apply a specific energy of less than about 90 W-Hr/kg to the composition. Specific energy is a measure of the amount of power that is being input by the extruder motor into each kilogram of material being processed. Specific energy is determined in two steps: (1) determine applied power and (2) calculate the specific energy (SE). Applied power is calculated according to the formula:

kW (applied)=(motor rating in kW)*(% torque)* (rpm running/maximum rpm*0.97 (gearbox efficiency))

where kW is kilowatts and rpm is screw speed in revolutions per minute.

Specific energy is then calculated according to the following formula:

Specific energy=kW (applied)/extrusion flow rate (in kilograms per hour (kg/hr))

Specific energy may be reported in units of watt-hours per kg (W-Hr/kg). A lower specific energy indicates that less mechanical energy is being applied to the composition, and a larger specific energy indicates more energy is being applied to the composition. Additional information regarding specific energy can be found in, for example, Repka, Langley and DiNunzio (Eds.), *Melt Extrusion Materials, Technology and Drug Product Design,* 2013, XII, Chapter 2, the disclosure of which is incorporated herein by this reference in its entirety. The amount of specific energy applied to an extruded composition can thus be modified by changing one or more variables described above, including but not limited to screw speed and extrusion flow (throughput) rate.

Residence time (the amount of time the polymer remains in the extruder) can also affect the properties of the extruded thermoplastic composition. Thus, in some aspects the thermoplastic composition is extruded under conditions that apply a specific energy of less than about 90 W-Hr/kg to the composition at a residence time of less than 70 seconds (s). It may be possible in certain aspects to increase the specific energy applied to the composition during extrusion and reduce the residence time of the composition in the extruder and achieve an extruded composition that has good properties. Thus, in particular aspects the thermoplastic composition is extruded under conditions that apply a specific energy of less than about 150 W-Hr/kg to the composition at a residence time of less than 60 s, or in further aspects at a residence time of less than 45 seconds.

It has been found that several of the properties of the thermoplastic compositions described herein can be improved by reducing the specific energy applied to the composition during extrusion. These properties include, but are not limited to, higher molecular weight Mw of the polycarbonate component, longer ceramic fiber length, higher strength (as evidenced by, for example, notched and/or unnotched Izod impact strength) and a higher elongation at break.

Accordingly, in some aspects the thermoplastic composition extruded under conditions that apply a specific energy of less than about 90 W-Hr/kg to the composition has a molecular weight—or less than about 150 W-Hr/kg at a residence time of less than 60 seconds—as determined by gel permeation chromatography (GPC), that is at least 30% higher than that of a substantially identical extruded thermoplastic composition extruded under conventional extrusion conditions that apply a specific energy of greater than 90 W-Hr/kg (for example, about 95 W-Hr/kg) to the extruded thermoplastic composition. In further aspects the thermoplastic composition extruded under conditions that apply a specific energy of less than about 90 W-Hr/kg to the composition—or less than about 150 W-Hr/kg at a residence time of less than 60 seconds—has a molecular weight, as determined by gel permeation chromatography (GPC), that is from about 30% to about 100% higher, or from about 30% to about 70% higher, than that of a substantially identical extruded thermoplastic composition extruded under conventional extrusion conditions that apply a specific energy of greater than 90 W-Hr/kg (e.g., about 95 W-Hr/kg) to the extruded thermoplastic composition.

In some aspects the ceramic fiber component of the thermoplastic composition extruded under conditions that apply a specific energy of less than about 90 W-Hr/kg to the composition—or less than about 150 W-Hr/kg at a residence time of less than 60 seconds—includes ceramic fibers having a fiber length that is at least 4% higher than that of a substantially identical extruded thermoplastic composition extruded under conventional extrusion conditions that apply a specific energy of about 95 W-Hr/kg to the extruded thermoplastic composition. In certain aspects the ceramic fiber component of the thermoplastic composition extruded under conditions that apply a specific energy of less than about 90 W-Hr/kg to the composition—or less than about 150 W-Hr/kg at a residence time of less than 60 seconds—includes ceramic fibers having a fiber length that is from about 4% to about 30% higher, or from about 4% to about 25% higher, than that of a substantially identical extruded thermoplastic composition extruded under conventional extrusion conditions that apply a specific energy of about 95 W-Hr/kg to the extruded thermoplastic composition.

In particular aspects the thermoplastic composition extruded under conditions that apply a specific energy of less than about 90 W-Hr/kg to the composition—or less than about 150 W-Hr/kg at a residence time of less than 60 seconds—has a notched Izod impact strength, as tested in accordance with ASTM D256, that is at least 25% higher than that of a substantially identical extruded thermoplastic composition extruded under conventional extrusion conditions that apply a specific energy of about 95 W-Hr/kg to the extruded thermoplastic composition. In certain aspects the thermoplastic composition extruded under conditions that apply a specific energy of less than about 90 W-Hr/kg to the composition—or less than about 150 W-Hr/kg at a residence time of less than 60 seconds—has a notched Izod impact strength, as tested in accordance with ASTM D256, that is from about 5% to about 150% higher, or from about 25% to about 125% higher, than that of a substantially identical extruded thermoplastic composition extruded under conventional extrusion conditions that apply a specific energy of about 95 W-Hr/kg to the extruded thermoplastic composition.

In some aspects the thermoplastic composition extruded under conditions that apply a specific energy of less than about 90 W-Hr/kg to the composition—or less than about 150 W-Hr/kg at a residence time of less than 60 seconds— has an elongation at break, as tested in accordance with ASTM D638, that is at least 15% higher than that of a substantially identical extruded thermoplastic composition extruded under conventional extrusion conditions that apply a specific energy of about 95 W-Hr/kg to the extruded thermoplastic composition. In other aspects the thermoplastic composition extruded under conditions that apply a specific energy of less than about 90 W-Hr/kg to the composition—or less than about 150 W-Hr/kg at a residence time of less than 60 seconds—has an elongation at break, as tested in accordance with ASTM D638, that is from about 15% to about 200% higher, or from about 15% to about 150% higher, than that of a substantially identical extruded thermoplastic composition extruded under conventional extrusion conditions that apply a specific energy of about 95 W-Hr/kg to the extruded thermoplastic composition.

Thermoplastic compositions according to aspects of the disclosure may also have good chemical resistance to various chemicals, including but not limited to aliphatic and aromatic organic solvents, such as those found in sunscreen.

Articles of Manufacture

In certain aspects, the present disclosure pertains to shaped, formed, or molded articles including the thermoplastic compositions. The thermoplastic compositions can be molded into useful shaped articles by a variety of means as described below.

Articles formed from thermoplastic compositions according to the present disclosure may include, but are not limited to, a housing, enclosure or internal structural component for: a speaker for a cellular communication device; a smart watch; a hand-held portable smart device; an energy storage device; a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment; a structural component of an electronic device; a portable computing device; a hand-held electronic device; an automotive device; a medical device; a sensor device; a security device; a shielding device; an RF antenna device; a light emitting diodeLED device; or an RFID device.

In particular aspects the article is a speaker housing for a cellular communication device, a housing for a smart watch, a housing for a hand-held portable smart device, or a housing for an energy storage device. The cellular communication device may include a smart phone. The energy storage device may include a battery.

Methods for Making Articles Including the Thermoplastic Compositions

Articles including the thermoplastic compositions according to aspects described herein may be formed according to any conventional method. In some aspects the article is extrusion-molded, injection-molded, compression-molded, thermoformed, overmolded, or insert-molded with a metallic or composite laminate insert.

If extrusion-molded, the one or any foregoing components described herein may first be dry blended together, then fed into an extruder from one or multi-feeders, or separately fed into an extruder from one or multi-feeders. The one or any foregoing components may be first dry blended with each other, or dry blended with any combination of foregoing components, then fed into an extruder from one or multi-feeders, or separately fed into an extruder from one or multi-feeders. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, conical screws, screws with pins, screws with screens, barrels with pins, rolls, rams, helical rotors, co-kneaders, disc-pack processors, various other types of extrusion equipment, or combinations including at least one of the foregoing. In particular aspects the extruder is a co-rotating twin-screw extruder.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

In particular aspects in which the article is extrusion-molded, a method for making a thermoplastic composition includes: combining the components of the thermoplastic composition to form a mixture; adding the mixture at a feed throat of an extruder and compounding the mixture in the extruder; and extruding the mixture into a mold to form the article. In other aspects one or more of the components of the thermoplastic composition (e.g., the ceramic fiber component) may be added downstream in the extruder according to conventional methods.

Specifically with respect to thermoplastic compositions described herein, methods of making a thermoplastic composition, include:

a) combining, to form a mixture: a polybutylene terephthalate (PBT) component including a high molecular weight PBT and a low molecular weight PBT; a polycarbonate component; and a compatibilizer component;

b) extruding the mixture to form the thermoplastic composition under extrusion conditions that apply a specific energy of less than about 90 W-Hr/kg to the thermoplastic composition at a residence time of less than 70 seconds—or a specific energy of less than about 150 W-Hr/kg to the thermoplastic composition at a residence time of less than 60 seconds or less than 45 seconds; and c) adding a ceramic fiber component to the mixture during either step (a) or during step (b).

The extruded thermoplastic composition includes:

i) from about 20 wt % to about 75 wt % of the ceramic fiber component;

ii) from about 15 wt % to about 70 wt % of the polybutylene terephthalate (PBT) component including the high molecular weight PBT and the low molecular weight PBT;

iii) from about 5 wt % to about 23 wt % of the polycarbonate component; and iv) from about 1 wt % to about 10 wt % of the compatibilizer component.

The combined weight percent value of all components does not exceed 100 wt %, and all weight percent values are based on the total weight of the thermoplastic composition.

In particular aspects it may be desirable to add the ceramic fiber component to the mixture during the extrusion step (step (b)), and in specific aspects downstream in the extruder so that the ceramic fibers only pass through the extruder barrel a short distance. In such aspects the ceramic fiber component should be added to the extruder early enough to sufficiently mix the fibers with the molten polymer matrix, but as late as possible to minimize fiber attrition or breakdown inside the barrel. Ceramic fibers added in this manner may have a longer fiber length (less fiber attrition) as compared to those that have had the ceramic fibers earlier in the extruder or even prior to extrusion (e.g., during step (a) above).

Thermoplastic compositions formed according to the methods described herein—and articles formed therefrom—can have any of the components and properties described above.

Various combinations of elements of this disclosure are encompassed by this disclosure, e.g., combinations of elements from dependent claims that depend upon the same independent claim.

ASPECTS OF THE DISCLOSURE

In various aspects, the present disclosure pertains to and includes at least the following aspects.

Aspect 1A. An extruded thermoplastic composition comprising:
- a) from about 20 wt % to about 75 wt % of a ceramic fiber component;
- b) from about 15 wt % to about 70 wt % of a polybutylene terephthalate (PBT) component comprising a high molecular weight PBT and a low molecular weight PBT;
- c) from about 5 wt % to about 23 wt % of a polycarbonate component; and
- d) from about 1 wt % to about 10 wt % of a compatibilizer component, wherein
- the combined weight percent value of all components does not exceed 100 wt %, and
- all weight percent values are based on the total weight of the extruded thermoplastic composition.

Aspect 1B. An extruded thermoplastic composition consisting essentially of:
- a) from about 20 wt % to about 75 wt % of a ceramic fiber component;
- b) from about 15 wt % to about 70 wt % of a polybutylene terephthalate (PBT) component comprising a high molecular weight PBT and a low molecular weight PBT;
- c) from about 5 wt % to about 23 wt % of a polycarbonate component; and
- d) from about 1 wt % to about 10 wt % of a compatibilizer component, wherein
- the combined weight percent value of all components does not exceed 100 wt %, and
- all weight percent values are based on the total weight of the extruded thermoplastic composition.

Aspect 1C. An extruded thermoplastic composition consisting of:
- a) from about 20 wt % to about 75 wt % of a ceramic fiber component;
- b) from about 15 wt % to about 70 wt % of a polybutylene terephthalate (PBT) component comprising a high molecular weight PBT and a low molecular weight PBT;
- c) from about 5 wt % to about 23 wt % of a polycarbonate component; and
- d) from about 1 wt % to about 10 wt % of a compatibilizer component, wherein
- the combined weight percent value of all components does not exceed 100 wt %, and
- all weight percent values are based on the total weight of the extruded thermoplastic composition.

Aspect 2. The extruded thermoplastic composition according to Aspects 1A-1C, wherein the polycarbonate component is a homopolymer comprising repeating units derived from bisphenol A, a polycarbonate copolymer comprising repeating units derived from bisphenol A, sebacic acid, polysiloxane, isophthalate terephthalate resorcinol (ITR), phosphate or a combination thereof.

Aspect 3. The extruded thermoplastic composition according to Aspect 1 or 2, wherein the ceramic fiber component has a tensile modulus of at least 150 GPa.

Aspect 4. The extruded thermoplastic composition according to any of Aspects 1 to 3, wherein the ceramic fiber component comprises alumina.

Aspect 5. The extruded thermoplastic composition according to any of Aspects 1 to 4, further comprising a transesterification quenching agent.

Aspect 6. The extruded thermoplastic composition according to Aspect 5, wherein the transesterification quenching agent is selected from the group consisting of: an acidic phosphate salt; a Group TB phosphate salt; a Group IIB phosphate salt; a phosphorus oxo-acid; and combinations thereof.

Aspect 7. The extruded thermoplastic composition according to Aspect 5 or 6, wherein the transesterification quenching agent comprises mono zinc phosphate.

Aspect 8. The extruded thermoplastic composition according to any of Aspects 5 to 7, wherein the transesterification quenching agent is present in an amount from greater than about 0 wt % to about 1 wt %.

Aspect 9. The extruded thermoplastic composition according to any of Aspects 1 to 8, further comprising an additive material, the additive material selected from the group consisting of: an impact modifier; an antioxidant; a colorant; a de-molding agent; a dye; a flow promoter; a flow modifier; a light stabilizer; a lubricant; a mold release agent; a pigment; a quenching agent; a thermal stabilizer; a UV absorbant; a UV reflectant; a UV stabilizer; an epoxy chain extender; a flame retardant; and combinations thereof.

Aspect 10. The extruded thermoplastic composition according to any of Aspects 1 to 9, wherein the extruded thermoplastic composition is extruded under conditions that apply a specific energy of less than about 90 W-Hr/kg to the extruded thermoplastic composition.

Aspect 11. The extruded thermoplastic composition according to Aspect 10, wherein the polycarbonate component in the extruded thermoplastic composition has a molecular weight, as determined by gel permeation chromatography (GPC), that is at least 30% higher than that of a substantially identical extruded thermoplastic composition extruded under conventional extrusion conditions that apply a specific energy of greater than 90 W-Hr/kg to the extruded thermoplastic composition.

Aspect 12. The extruded thermoplastic composition according to any of Aspects 1 to 11, wherein the extruded thermoplastic composition is extruded under conditions that apply a specific energy of less than about 90 W-Hr/kg to the composition at a residence time of less than 70 seconds.

Aspect 13. The extruded thermoplastic composition according to any of Aspects 1 to 11, wherein the extruded thermoplastic composition is extruded under conditions that apply a specific energy of less than about 150 W-Hr/kg to the composition at a residence time of less than 60 seconds.

Aspect 14. The extruded thermoplastic composition according to any of Aspects 10 to 13, wherein the ceramic fiber component of the extruded thermoplastic composition comprises ceramic fibers having a fiber length that is at least 4% higher than that of a substantially identical extruded thermoplastic composition extruded under conventional extrusion conditions that apply a specific energy of about 95 W-Hr/kg to the extruded thermoplastic composition.

Aspect 15. The extruded thermoplastic composition according to any of Aspects 10 to 14, wherein the extruded thermoplastic composition has a notched Izod impact strength, as tested in accordance with ASTM D256, that is at least 25% higher than that of a substantially identical extruded thermoplastic composition extruded under conventional extrusion conditions that apply a specific energy of about 95 W-Hr/kg to the extruded thermoplastic composition.

Aspect 16. The extruded thermoplastic composition according to any of Aspects 10 to 15, wherein the extruded thermoplastic composition has an elongation at break, as tested in accordance with ASTM D638, that is at least 15% higher than that of a substantially identical extruded thermoplastic composition extruded under conventional extrusion conditions that apply a specific energy of about 95 W-Hr/kg to the extruded thermoplastic composition.

Aspect 17A. A method of making a thermoplastic composition, comprising:
 a) combining, to form a mixture: a polybutylene terephthalate (PBT) component comprising a high molecular weight PBT and a low molecular weight PBT; a polycarbonate component; and a compatibilizer component;
 b) extruding the mixture to form the thermoplastic composition under extrusion conditions that apply a specific energy of less than about 90 W-Hr/kg to the thermoplastic composition at a residence time of less than 70 seconds or that apply a specific energy of less than about 150 W-Hr/kg to the composition at a residence time of less than 60 seconds; and
 c) adding a ceramic fiber component to the mixture during either step (a) or during step (b),
wherein
 the extruded thermoplastic composition comprises:
  i) from about 20 wt % to about 75 wt % of the ceramic fiber component;
  ii) from about 15 wt % to about 70 wt % of the polybutylene terephthalate (PBT) component comprising the high molecular weight PBT and the low molecular weight PBT;
  iii) from about 5 wt % to about 23 wt % of the polycarbonate component; and
  iv) from about 1 wt % to about 10 wt % of the compatibilizer component,
 the combined weight percent value of all components does not exceed 100 wt %, and
 all weight percent values are based on the total weight of the thermoplastic composition.

Aspect 17B. A method of making a thermoplastic composition, the method consisting essentially of:
 a) combining, to form a mixture: a polybutylene terephthalate (PBT) component comprising a high molecular weight PBT and a low molecular weight PBT; a polycarbonate component; and a compatibilizer component;
 b) extruding the mixture to form the thermoplastic composition under extrusion conditions that apply a specific energy of less than about 90 W-Hr/kg to the thermoplastic composition at a residence time of less than 70 seconds or that apply a specific energy of less than about 150 W-Hr/kg to the composition at a residence time of less than 60 seconds; and
 c) adding a ceramic fiber component to the mixture during either step (a) or during step (b),
wherein
 the extruded thermoplastic composition comprises:
  i) from about 20 wt % to about 75 wt % of the ceramic fiber component;
  ii) from about 15 wt % to about 70 wt % of the polybutylene terephthalate (PBT) component comprising the high molecular weight PBT and the low molecular weight PBT;
  iii) from about 5 wt % to about 23 wt % of the polycarbonate component; and
  iv) from about 1 wt % to about 10 wt % of the compatibilizer component,
 the combined weight percent value of all components does not exceed 100 wt %, and
 all weight percent values are based on the total weight of the thermoplastic composition.

Aspect 17C. A method of making a thermoplastic composition, the method consisting of:
 a) combining, to form a mixture: a polybutylene terephthalate (PBT) component comprising a high molecular weight PBT and a low molecular weight PBT; a polycarbonate component; and a compatibilizer component;
 b) extruding the mixture to form the thermoplastic composition under extrusion conditions that apply a specific energy of less than about 90 W-Hr/kg to the thermoplastic composition at a residence time of less than 70 seconds or that apply a specific energy of less than about 150 W-Hr/kg to the composition at a residence time of less than 60 seconds; and
 c) adding a ceramic fiber component to the mixture during either step (a) or during step (b),
wherein
 the extruded thermoplastic composition comprises:
  i) from about 20 wt % to about 75 wt % of the ceramic fiber component;
  ii) from about 15 wt % to about 70 wt % of the polybutylene terephthalate (PBT) component comprising the high molecular weight PBT and the low molecular weight PBT;
  iii) from about 5 wt % to about 23 wt % of the polycarbonate component; and
  iv) from about 1 wt % to about 10 wt % of the compatibilizer component,
 the combined weight percent value of all components does not exceed 100 wt %, and
 all weight percent values are based on the total weight of the thermoplastic composition.

Aspect 18. The method according to Aspect 17, wherein the polycarbonate component is a homopolymer comprising repeating units derived from bisphenol A, a polycarbonate copolymer comprising repeating units derived from bisphenol A, sebacic acid, polysiloxane, isophthalate terephthalate resorcinol (ITR), phosphate or a combination thereof.

Aspect 19. The method according to Aspect 17 or 18, wherein the ceramic fiber component has a tensile modulus of at least 150 GPa.

Aspect 20. The method according to any of Aspects 17 to 19, wherein the ceramic fiber component comprises alumina.

Aspect 21. The method according to any of Aspects 17 to 20, further comprising a transesterification quenching agent.

Aspect 22. The method according to Aspect 21, wherein the transesterification quenching agent is selected from the group consisting of: an acidic phosphate salt; a Group TB phosphate salt; a Group IIB phosphate salt; a phosphorus oxo-acid; and combinations thereof.

Aspect 23. The method according to Aspect 21 or 22, wherein the transesterification quenching agent comprises mono zinc phosphate.

Aspect 24. The method according to any of Aspects 21 to 23, wherein the transesterification quenching agent is present in an amount from greater than about 0 wt % to about 1 wt %.

Aspect 25. The method according to any of Aspects 17 to 24, further comprising an additive material, the additive material selected from the group consisting of: an impact modifier; an antioxidant; a colorant; a de-molding agent; a dye; a flow promoter; a flow modifier; a light stabilizer; a lubricant; a mold release agent; a pigment; a quenching agent; a thermal stabilizer; a UV absorbant; a UV reflectant; a UV stabilizer; an epoxy chain extender; a flame retardant; and combinations thereof.

Aspect 26. The method according to any of Aspects 17 to 25, wherein the polycarbonate component in the extruded thermoplastic composition has a molecular weight, as determined by gel permeation chromatography (GPC), that is at least 30% higher than that of a substantially identical extruded thermoplastic composition extruded under conventional extrusion conditions that apply a specific energy of about 95 W-Hr/kg to the extruded thermoplastic composition at a residence time of about 60 seconds.

Aspect 27. The method according to any of Aspects 17 to 26, wherein the ceramic fiber component of the extruded thermoplastic composition comprises ceramic fibers having a fiber length that is at least 4% higher than that of a substantially identical extruded thermoplastic composition extruded under conventional extrusion conditions that apply a specific energy of about 95 W-Hr/kg to the extruded thermoplastic composition at a residence time of about 60 seconds.

Aspect 28. The method according to any of Aspects 17 to 27, wherein the extruded thermoplastic composition has a notched Izod impact strength, as tested in accordance with ASTM D256, that is at least 25% higher than that of a substantially identical extruded thermoplastic composition extruded under conventional extrusion conditions that apply a specific energy of about 95 W-Hr/kg to the extruded thermoplastic composition at a residence time of about 60 seconds.

Aspect 29. The method according to any of Aspects 17 to 28, wherein the extruded thermoplastic composition has an elongation at break, as tested in accordance with ASTM D638, that is at least 15% higher than that of a substantially identical extruded thermoplastic composition extruded under conventional extrusion conditions that apply a specific energy of about 95 W-Hr/kg to the extruded thermoplastic composition at a residence time of about 60 seconds.

Aspect 30. An article comprising a thermoplastic composition according to any of Aspects 1 to 29.

Aspect 31. The article according to Aspect 30, wherein the article is a housing, enclosure or internal structural component for: a speaker for a cellular communication device; a smart watch; a hand-held portable smart device; an energy storage device; a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment; a structural component of an electronic device; a portable computing device; a hand-held electronic device; an automotive device; a medical device; a sensor device; a security device; a shielding device; an RF antenna device; an LED device; or an RFID device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The components listed in Table 1 were included in one or more of the compositions described herein:

TABLE 1

| | | Components | | |
|---|---|---|---|---|
| Commercial name | Supplier | Material description/function | Composition/Property | CAS# |
| VALOX ™ Resin 315 | SABIC | High Mw PBT | 700 Pa-s (high viscosity); melt viscosity from 7500-9500 poise | 24968-12-5 |
| VALOX ™ Resin 195 | SABIC | Low Mw PBT | 74-90 Pa-s; melt viscosity from 740-900 poise | 24968-12-5 |
| Lotader ™ AX8900 | Arkema | A random terpolymer of ethylene, acrylic ester and glycidyl methacrylate | 6 g/10 min; 8% wt glycidyl-MA; 1100% elongation | 51541-08-3 |
| Hytrel ™ 4056 | DuPont | Hytrel 4056 | low modulus; low-T impact; butylene/poly(alkylene ether) phthalate: 5.3 g/10 min at 2.16 kg at 190° C. | 65447-77-0 |
| GLYCOLUBE ™ P (ETS) | LONZA | Lubricant | Pentaerythrityl tetrastearate; mold release/external lubricate | 115-83-3 |
| EVERNOX ™ 10 | Everspring Chemical | Phenolic primary antioxidant | hindered phenolic antioxidant based on pentaerythritol tetrakis (3-(3,5-di-tery-butyl-4-hydroxyphenyl)-propionate | 6683-19-8 |

TABLE 1-continued

| Commercial name | Supplier | Material description/function | Composition/Property | CAS# |
|---|---|---|---|---|
| EVERFOS ™-168 | Everspring Chemical | Processing stabilizer | Tris (2,4-di-tery-butylphenyl) phosphite | 31570-04-4 |
| Mono zinc phosphate | ICL | Trans-esterification quencher | mono zinc phosphate | 13598-37-3 |
| Tinuvin ™ 329 | BASF | UV stabilizer | 2-(2H-Benzotriazol-2-yl)-4-(1,1,3,3-tetramethylbutyl)phenol | 3147-75-9 |
| Elvaloy AC ™ | DuPont | Impact modifier | ethylene-ethylacrylate copolymer | 9010-86-0 |
| PC resin | SABIC | Lexan ™ 104R | MVR 7 g/10 min at 300° C./1.2 kgf; high viscosity | 25037-45-0 |
| Nextel ™ 610 | 3M | Ceramic oxide fiber (α-Al$_2$O$_3$) | 10,000 denier, 13 microns in diameter; 6 mm in length | 1344-28-1 |
| StarStran ™ 718 | Johns Manville | E-glass fiber | 13 micron diameter, 1/8" (0.3175 cm) length | 65997-17-3 |
| CSG3PA-830 | Nittobo | Flat E-glass fiber | 7 micron thick, 28 micron width (flat ratio 4); 4 mm length | 65997-17-3 |

Figure 2:
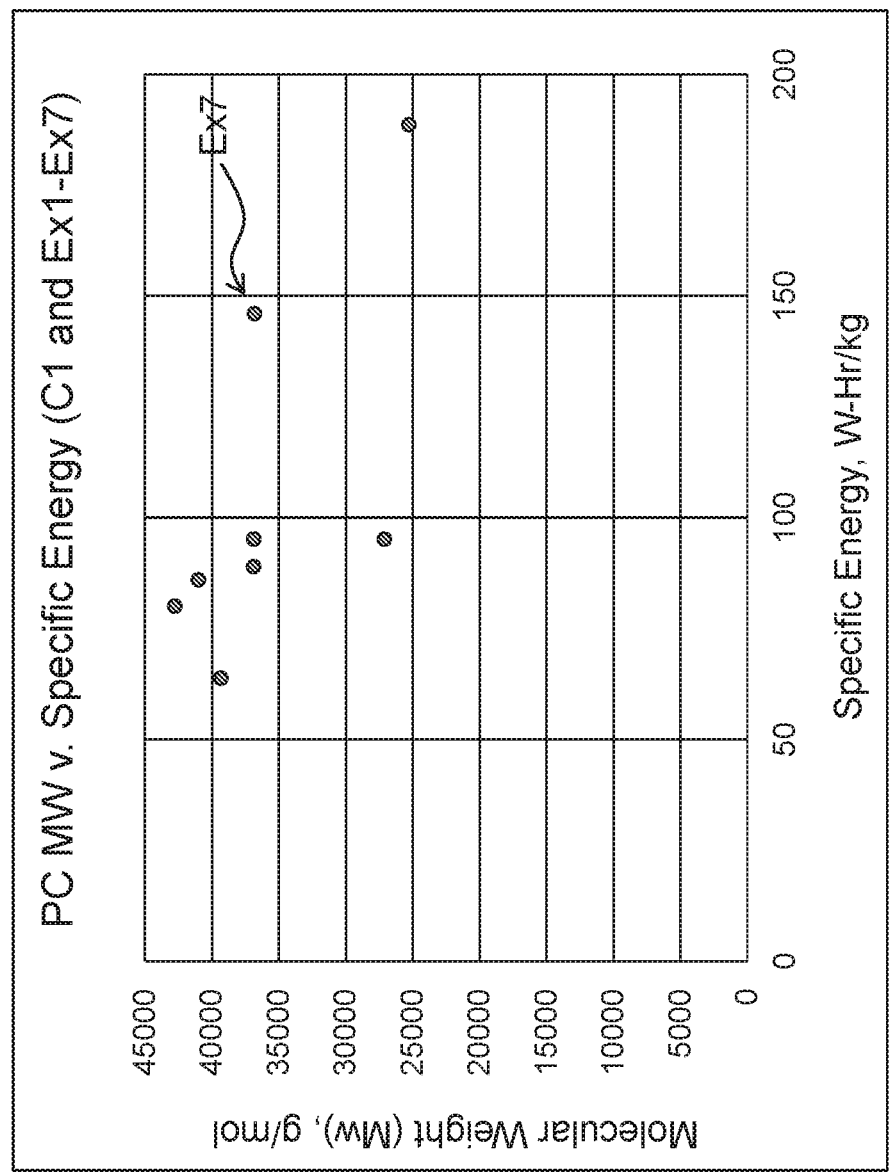
FIG. 2 is a graph showing PC molecular weight vs. specific energy for thermoplastic compositions according to aspects of the disclosure.

Specific compositions A-E included the components shown in FIG. 2. Example compositions A-C included ceramic fiber; comparative compositions D and E included glass fiber:

TABLE 2

Compositions

| Component | 60% Ceramic fiber | 50% Ceramic fiber | 70% Ceramic fiber | 60% E-Glass fiber | 50% Flat E-Glass Fiber |
|---|---|---|---|---|---|
| VALOX ™ Resin 315 PBT | 5.38 | 7.08 | 3.69 | 5.38 | 7.08 |
| VALOX ™ Resin 195 PBT | 18.47 | 24.31 | 12.66 | 18.47 | 24.31 |
| Lotader ™ AX8900 | 3 | 3 | 3 | 3 | 3 |
| Hytrel ™ 4056 | 2.5 | 2.5 | 2.5 | 2.5 | 2.5 |
| GLYCOLUBE ™ P (ETS) | 0.2 | 0.2 | 0.2 | 0.2 | 0.2 |
| EVERNOX ™ 10 | 0.1 | 0.1 | 0.1 | 0.1 | 0.1 |
| EVERFOS ™-168 | 0.2 | 0.2 | 0.2 | 0.2 | 0.2 |
| Mono zinc phosphate | 0.1 | 0.1 | 0.1 | 0.1 | 0.1 |
| Tinuvin ™ 329 | 0.25 | 0.25 | 0.25 | 0.25 | 0.25 |
| Elvaloy AC ™ | 2 | 2 | 2 | 2 | 2 |
| PC resin | 7.80 | 10.26 | 5.30 | 7.80 | 10.26 |
| Nextel ™ 610 | 60 | 50 | 70 | — | — |
| StarStran ™ 718 | — | — | — | 60 | — |
| CSG3PA-830 | — | — | — | — | 50 |
|  | 100 | 100 | 100 | 100 | 100 |

Compositions A-E were formed with the processing conditions listed in Tables 3A and 3B, and had the listed properties:

TABLE 3A

Compositions Formed by Various Extrusion Conditions

| Example No. | | C1 | Ex1 | Ex2 | Ex3 | Ex4 | Ex5 | Ex6 | Ex7 |
|---|---|---|---|---|---|---|---|---|---|
| Composition ID | | A | A | A | A | A | A | A | A |
| Fiber loading, wt % | | 60 | 60 | 60 | 60 | 60 | 60 | 60 | 60 |
| Specific energy | W-hr/kg | 95.1 | 188.6 | 95.2 | 89.0 | 86.0 | 63.8 | 80.0 | 146.0 |
| Melt residence time, resin | s | 95 | 67 | 77 | 69 | 85 | 75 | 63 | 42 |

TABLE 3A-continued

Compositions Formed by Various Extrusion Conditions

| Example No. | | | C1 | Ex1 | Ex2 | Ex3 | Ex4 | Ex5 | Ex6 | Ex7 |
|---|---|---|---|---|---|---|---|---|---|---|
| Fiber Length | | SEM | 207 | 247 | 247 | 224 | 251 | 217 | 239 | 266 |
| PC Mw | | GPC | 27111 | 25290 | 36869 | 36891 | 41014 | 39325 | 42768 | 36831 |
| PBT Mw (avg) | | GPC | 64896 | 59327 | 73144 | 65420 | 72620 | 71969 | 63266 | 70464 |
| Flexural Modulus | GPa | ASTM D 790 | 23.6 | 22.8 | 25.5 | 24.3 | 23.8 | 23.2 | 20.5 | 24.0 |
| Flexural Stress at Yield | MPa | ASTM D 790, 3-point flexural test | 157 | 145 | 173 | 181 | 175 | 182 | 176 | 179 |
| Notched Izod Impact Strength | J/m | ASTM D 256 | 120 | 103 | 130 | 183 | 157 | 198 | 260 | 178 |
| Unnotched Izod Impact Strength | J/m | ASTM D 256 | 516 | 529 | 642 | 748 | 632 | 783 | 891 | 779 |
| Tensile Modulus | GPa | ASTM D 638 | 31.52 | 28.5 | 33.54 | 32.46 | 31.96 | 31.06 | 27.1 | 31.30 |
| Tensile Strength at Yield | MPa | ASTM D 638 | 103 | 92.6 | 117 | 121 | 117 | 120 | 111 | 114 |
| Tensile Strength at Break | MPa | ASTM D 638 | 103 | 92.1 | 116 | 120 | 116 | 119 | 110 | 113 |
| % Elongation at Yield | % | ASTM D 638 | 0.99 | 0.85 | 1.12 | 1.53 | 1.36 | 1.7 | 2.26 | 1.95 |
| % Elongation at Break | % | ASTM D 638 | 1.04 | 0.88 | 1.21 | 1.6 | 1.47 | 1.83 | 2.48 | 1.95 |
| MVR (275° C., 5 Kg) | cm³/10 min | ASTM D 1238 | 25.6 | 42.8 | 30.7 | 15.5 | 20.5 | 10.9 | X | 13.4 |
| MVR (285° C., 5 Kg) | cm³/10 min | ASTM D 1238 | 40 | 73 | 49.3 | 26.7 | 36 | 18.8 | 1.7 | 25.3 |

TABLE 3B

Compositions Formed by Various Extrusion Conditions

| Example No. | | | C1 | Ex5 | Ex8 | Ex9 | C2 | C3 |
|---|---|---|---|---|---|---|---|---|
| Composition ID | | | A | A | B | C | D | E |
| Fiber loading, wt % | | | 60 | 60 | 50 | 70 | 60 | 50 |
| Specific energy | W-hr/kg | | 95.1 | 63.8 | 105.7 | 81.2 | 95.2 | 184.4 |
| Melt residence time, resin | s | | 95 | 75 | NT | NT | NT | NT |
| Fiber Length | | SEM | 207 | 217 | 358 | 234 | 220 | 335 |
| PC Mw | | GPC | 27111 | 39325 | 46979 | 33832 | 22853 | 50200 |
| PBT Mw (avg) | | GPC | 64896 | 71969 | 71523 | 75103 | 67725 | 60318 |
| Flexural Modulus | GPa | ASTM D 790 | 23.6 | 23.2 | 19.700 | 27.400 | 15.400 | 12.700 |
| Flexural Stress at Yield | MPa | ASTM D 790, 3-point flexural test | 157 | 182 | 185 | 146 | 188 | 257 |
| Notched Izod Impact Strength | J/m | ASTM D 256 | 120 | 198 | 153 | 158 | 160 | 229 |
| Unnotched Izod Impact Strength | J/m | ASTM D 256 | 516 | 783 | 777 | 513 | 727 | 1100 |
| Tensile Modulus | GPa | ASTM D 638 | 31.52 | 31.06 | 25.800 | 35.980 | 18.920 | 15.980 |
| Tensile Strength at Yield | MPa | ASTM D 638 | 103 | 120 | 120 | 93.3 | 127 | 173 |
| Tensile Strength at Break | MPa | ASTM D 638 | 103 | 119 | 119 | 91.9 | 126 | 173 |
| % Elongation at Yield | % | ASTM D 638 | 0.99 | 1.7 | 1.61 | 1.47 | 1.85 | 2.11 |
| % Elongation at Break | % | ASTM D 638 | 1.04 | 1.83 | 1.73 | 1.47 | 1.9 | 2.11 |

TABLE 3B-continued

Compositions Formed by Various Extrusion Conditions

| Example No. | | | C1 | Ex5 | Ex8 | Ex9 | C2 | C3 |
|---|---|---|---|---|---|---|---|---|
| MVR (275° C., 5 Kg) | cm³/10 min | ASTM D 1238 | 25.6 | 10.9 | 35.6 | 8.89 | X | 15 |
| MVR (285° C., 5 Kg) | cm³/10 min | ASTM D 1238 | 40 | 18.8 | 62.1 | 10.7 | 2.84 | 25 |

From the data set forth in Tables 3A and 3B, numerous observations can be made. As the molecular weight of the polymer increases, tensile elongation increases. Higher polymer Mw also favors impact properties, including notched and unnotched Izod impact properties.

With reference to FIGS. 1-5, the effect of specific energy on various properties of the Example A compositions (C1 and Ex1-Ex7) can be evaluated. As shown in FIG. 1, the Mw of PBT in the composition is generally not affected by the specific energy applied to the composition during extrusion. A clearer trend is seen with PC Mw in FIG. 2; lower specific energy extrusions (less than 90 W-Hr/kg) result in higher PC Mw, indicating less breakdown of the polymer. Of note, the composition of Ex7, which was extruded at a relatively high specific energy level (146 W-Hr/kg) but which only had a residence time of 42 seconds (in contrast to the other compositions which were all processed for over 60 seconds), had relatively high PBT and PC Mw values. This indicates that higher specific energies could be applied to the extrusions as long as the residence time of the composition in the extruder is reduced.

Figure 3:
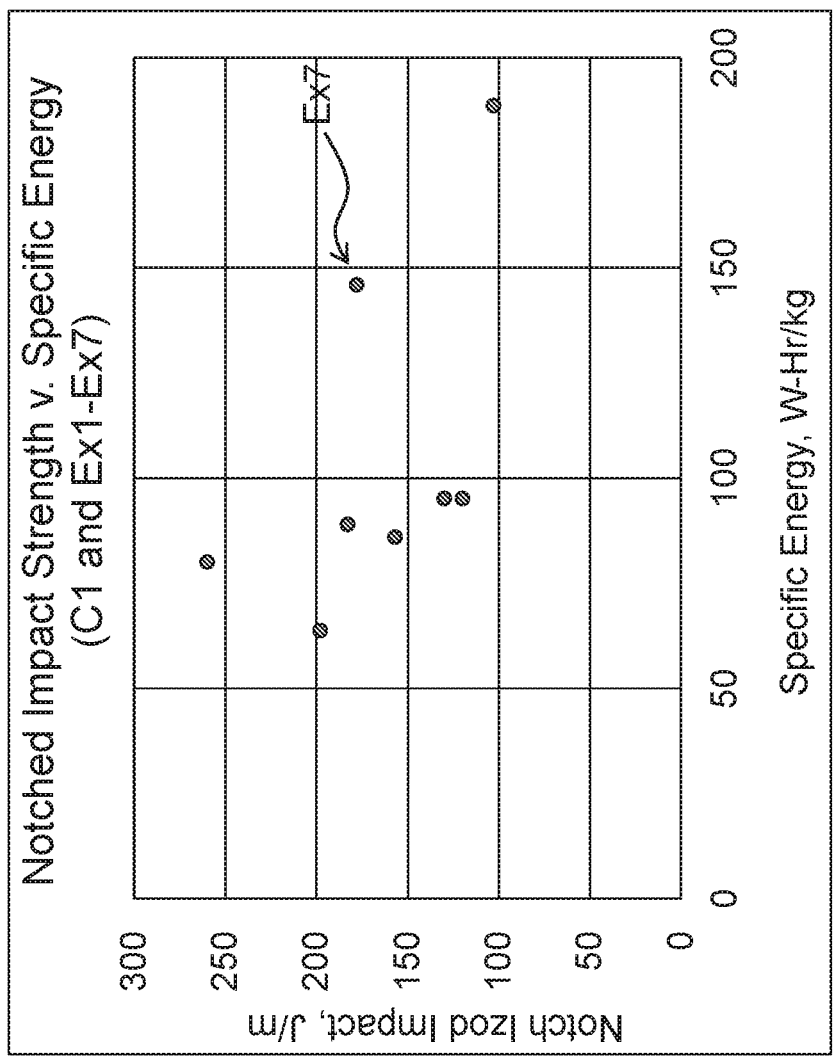
FIG. 3 is a graph showing notched Izod impact strength vs. specific energy for thermoplastic compositions according to aspects of the disclosure.
Figure 4:
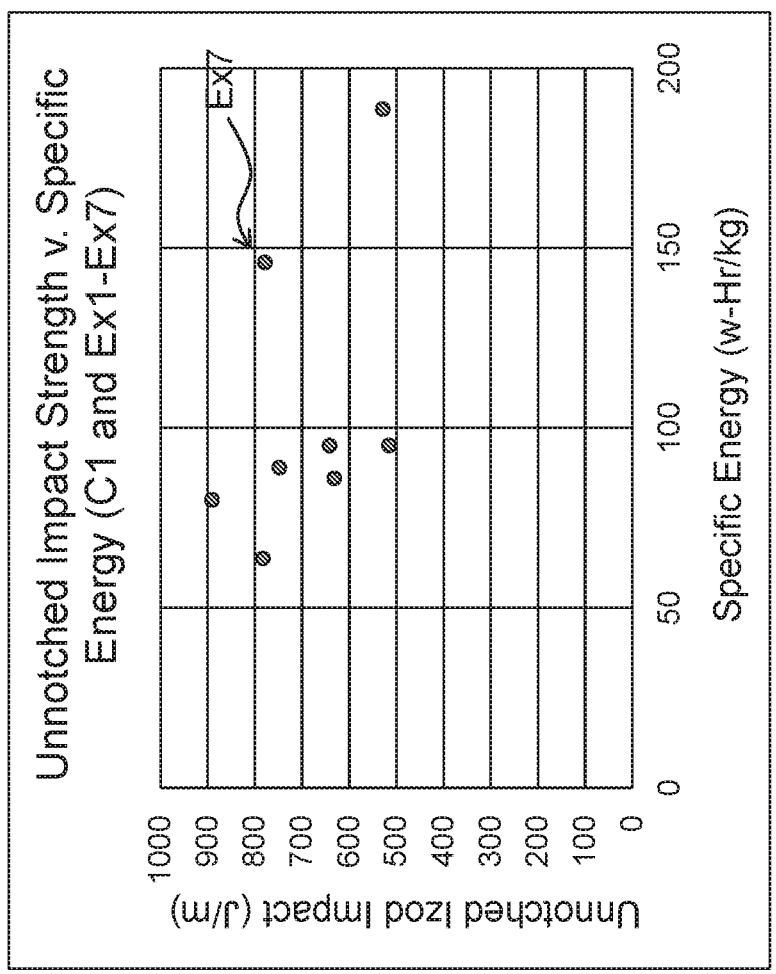
FIG. 4 is a graph showing unnotched Izod impact strength vs. specific energy for thermoplastic compositions according to aspects of the disclosure.

As shown in FIGS. 3 and 4, notched and unnotched Izod impact strength can be improved if a lower specific energy (less than 90 W-Hr/kg) is applied to the extrusions. Note that these figures show Ex7 as having relatively high impact strength even at a higher specific energy (but with a lower dwell time).

Figure 5:
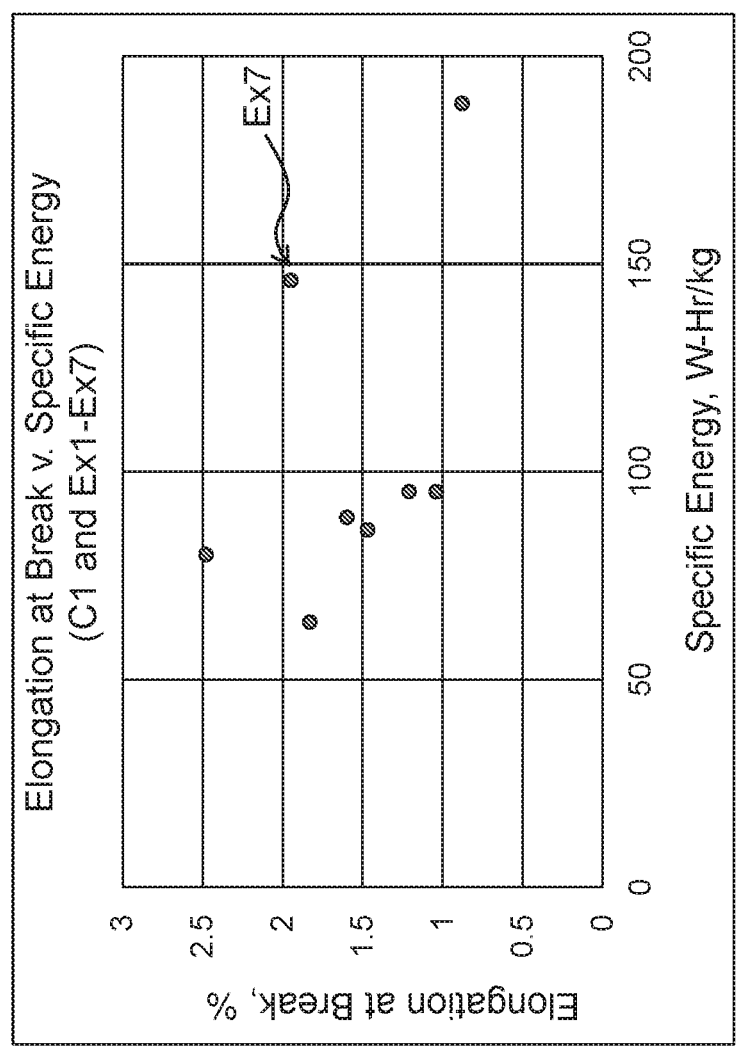
FIG. 5 is a graph showing elongation at break vs. specific energy for thermoplastic compositions according to aspects of the disclosure.

Elongation at break is illustrated in FIG. 5, which also shows a trend of improved elongation at lower specific energies (less than 90 W-Hr/kg). Consistent with the other results, the Ex7 composition also had good elongation performance.

Extrusion processes, such as a twin-screw extrusion process, dramatically break down fibers and reduce their length due to extremely high shearing force inside the barrel. As an example, a conventional chopped E-glass fiber has fiber length of around 3-6 millimeter (mm) before processing, but a residual fiber length after processing of only about 0.3 mm. Further, ceramic fiber such as α-Al$_2$O$_3$ ceramic fiber is a highly crystalline mineral that is very brittle in nature. The fiber length breaks down more significantly during extrusion, negatively affecting the material properties and in particular impact performance. From the data presented above it is evident that fiber length retention, polymer Mw, impact and elongation properties can be improved by applying a specific energy of less than about 90 W-Hr/kg to the composition during extrusion.

Figure 8:
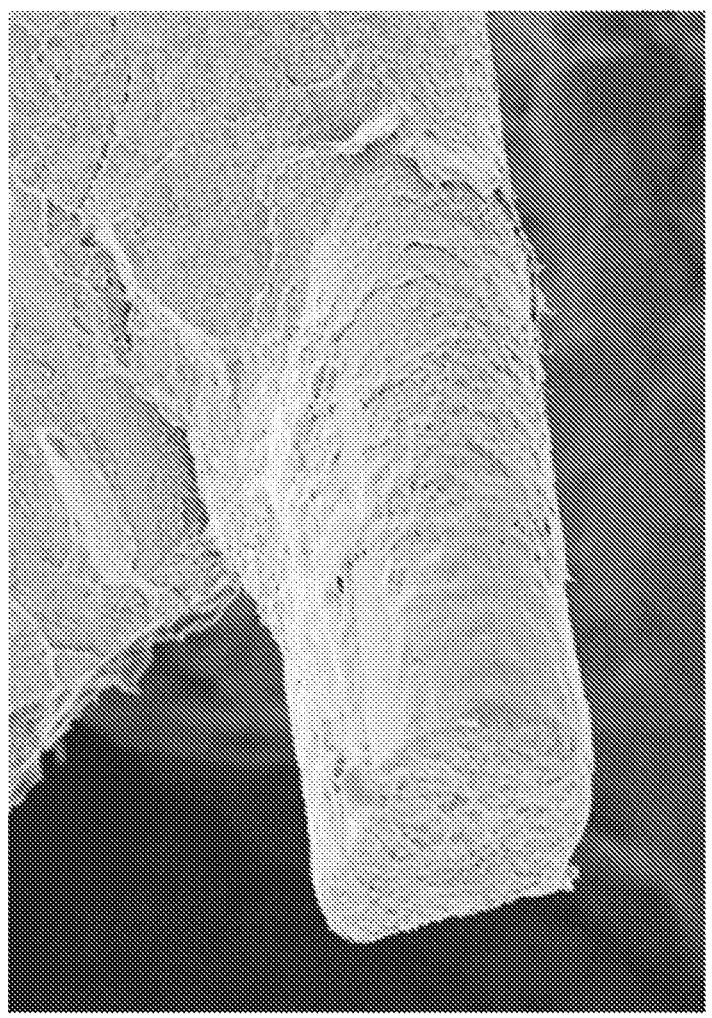
FIG. 8 is a SEM image showing fiber adhesion within a polymer matrix of an example composition (Ex5) described in the examples of the disclosure.

Scanning electron microscopy (SEM) images of C1, Ex1 and Ex5 are shown in FIGS. 6-8, respectively. As shown in FIG. 6 (C1), the fiber surface is predominantly clean, indicating poor adhesion of the fiber to the polymer. In addition, a gap is evident between the fiber and polymer matrix, providing further evidence of poor adhesion. FIG. 7 (Ex1), which was extruded at a very high specific energy, shows better fiber adhesion as evidenced by the clean/flat fracture cross section, but the polymer matrix is brittle, likely due to molecular weight reduction. Finally, FIG. 8 (Ex5) showing a composition processes with a high throughput rate and low temperature, has much improved fiber adhesion, which helps to explain the improved mechanical properties (e.g., tensile elongation and impact) of this composition.

From the data, processing conditions to produce the high-performance composites were identified; such as, processing conditions that favor molecular weight and fiber length retention, resulting in improved mechanical properties. In addition, compositions including ceramic fiber (which has an exceptionally high stiffness) exhibit a very high elastic modulus, making them suitable for very demanding applications, such as but not limited to very thin-wall electronic devices.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. An extruded thermoplastic composition comprising:
   a) from about 20 wt % to about 75 wt % of a ceramic fiber component;
   b) from about 15 wt % to about 70 wt % of a polybutylene terephthalate (PBT) component comprising a high molecular weight PBT and a low molecular weight PBT;
   c) from about 5 wt % to about 23 wt % of a polycarbonate component; and
   d) from about 1 wt % to about 10 wt % of a compatibilizer component,
   wherein
   the extruded thermoplastic composition is extruded under conditions that apply a specific energy of less than 90 W-Hr/kg to the extruded thermoplastic composition at a residence time of less than 77 seconds, or that apply a specific energy of less than 150 W-Hr/kg to the composition at a residence time of less than 60 seconds, the extruded thermoplastic composition has a notched Izod impact strength of at least 157 Joules per meter (J/m) as determined in accordance with ASTM D256, the extruded thermoplastic composition has a tensile elongation at break of at least 1.47% as determined in accordance with ASTM D638, the combined weight percent value of all components does not exceed 100 wt %, and all weight percent values are based on the total weight of the extruded thermoplastic composition.

2. The extruded thermoplastic composition according to claim 1, wherein the polycarbonate component is a homopolymer comprising repeating units derived from bisphenol A, a polycarbonate copolymer comprising repeating units derived from bisphenol A, sebacic acid, polysiloxane, isophthalate terephthalate resorcinol (ITR), phosphate or a combination thereof.

3. The extruded thermoplastic composition according to claim 1, wherein the ceramic fiber component comprises alumina.

4. The extruded thermoplastic composition according to claim 1, further comprising a transesterification quenching agent selected from the group consisting of:

an acidic phosphate salt; a Group IB phosphate salt; a Group IIB phosphate salt; a phosphorus oxo-acid; and combinations thereof.

5. The extruded thermoplastic composition according to claim 4, wherein the transesterification quenching agent is present in an amount from greater than about 0 wt % to about 1 wt %.

6. The extruded thermoplastic composition according to claim 1, further comprising an additive material, the additive material selected from the group consisting of: an impact modifier; an antioxidant; a colorant; a de-molding agent; a dye; a flow promoter; a flow modifier; a light stabilizer; a lubricant; a mold release agent; a pigment; a quenching agent; a thermal stabilizer; a UV absorbant; a UV reflectant; a UV stabilizer; an epoxy chain extender; a flame retardant; and combinations thereof.

7. A method of making a thermoplastic composition, comprising:

a) combining, to form a mixture: a polybutylene terephthalate (PBT) component comprising a high molecular weight PBT and a low molecular weight PBT; a polycarbonate component; and a compatibilizer component;

b) extruding the mixture to form the thermoplastic composition under extrusion conditions that apply a specific energy of less than 90 W-Hr/kg to the thermoplastic composition at a residence time of less than 77 seconds, or that apply a specific energy of less than 150 W-Hr/kg to the composition at a residence time of less than 60 seconds; and c) adding a ceramic fiber component to the mixture during either step (a) or during step (b), wherein the extruded thermoplastic composition comprises:
  i) from about 20 wt % to about 75 wt % of the ceramic fiber component;
  ii) from about 15 wt % to about 70 wt % of the polybutylene terephthalate (PBT) component comprising the high molecular weight PBT and the low molecular weight PBT;
  iii) from about 5 wt % to about 23 wt % of the polycarbonate component; and
  iv) from about 1 wt % to about 10 wt % of the compatibilizer component, the extruded thermoplastic composition has a notched Izod impact strength of at least 157 Joules per meter (J/m) as determined in accordance with ASTM D256, the extruded thermoplastic composition has a tensile elongation at break of at least 1.47% as determined in accordance with ASTM D638, the combined weight percent value of all components does not exceed 100 wt %, and all weight percent values are based on the total weight of the thermoplastic composition.

8. An article comprising a thermoplastic composition according to claim 1, wherein the article is a housing, enclosure or internal structural component for: a speaker for a cellular communication device; a smart watch; a hand-held portable smart device; an energy storage device; a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment; a structural component of an electronic device; a portable computing device; a hand-held electronic device; an automotive device; a medical device; a sensor device; a security device; a shielding device; an RF antenna device; an LED device; or an RFID device.

9. The extruded thermoplastic composition according to claim 1, wherein the extruded thermoplastic composition has a notched Izod impact strength of at least 178 J/m as determined in accordance with ASTM D256, and the extruded thermoplastic composition has a tensile elongation at break of at least 1.6% as determined in accordance with ASTM D638.

* * * * *